No. 858,113. PATENTED JUNE 25, 1907.
E. F. SMITH.
DRILL FEED.
APPLICATION FILED MAY 27, 1905.
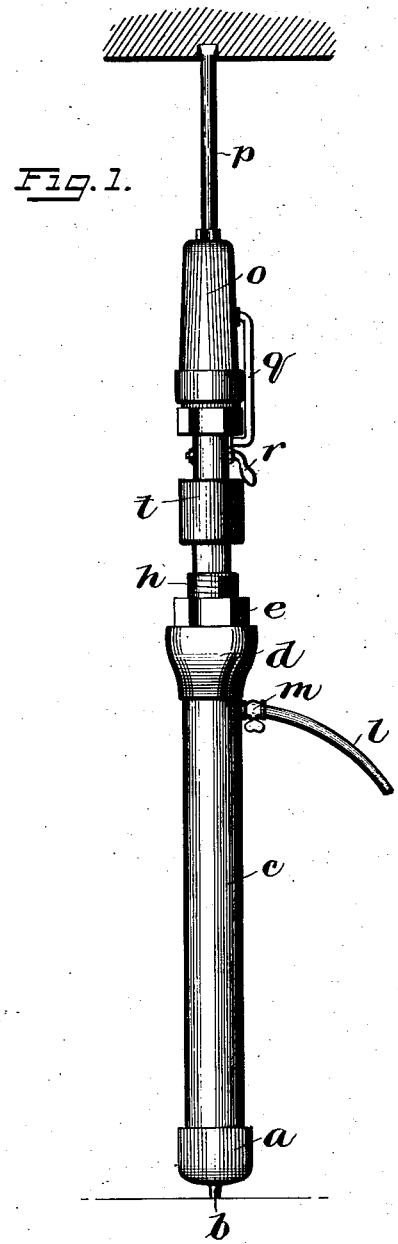
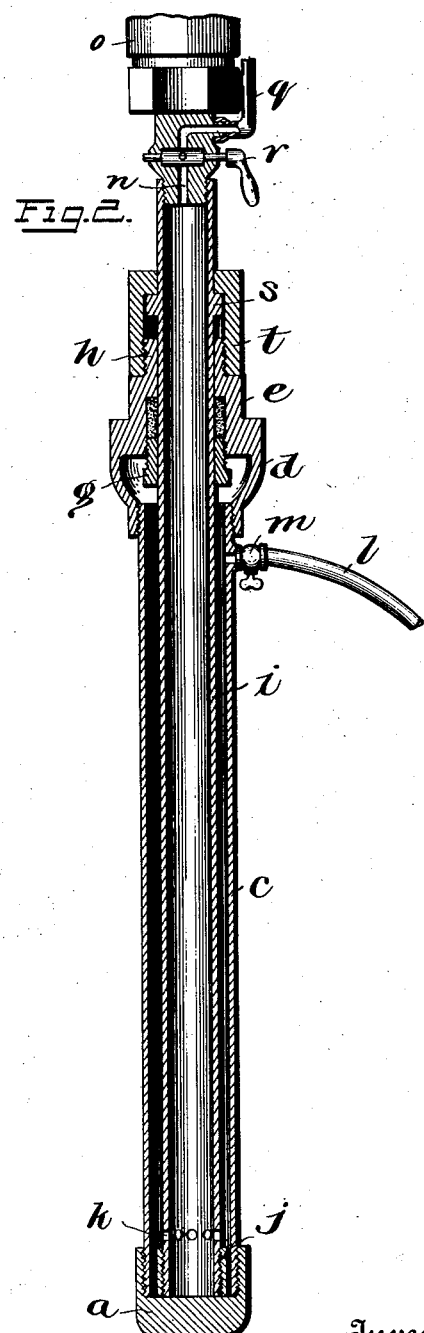

UNITED STATES PATENT OFFICE.

ELMER F. SMITH, OF CRIPPLE CREEK, COLORADO.

DRILL-FEED.

No. 858,113. Specification of Letters Patent. Patented June 25, 1907.

Application filed May 27, 1905. Serial No. 262,671.

*To all whom it may concern:*

Be it known that I, ELMER F. SMITH, a citizen of the United States, residing at Cripple Creek, in the county of Teller and State of Colorado, have invented certain new and useful Improvements in Drill-Feeds; and I do hereby declare the following to be a full, clear, and exact dsecription of the invention, such as will enable others skilled in the art to which it appertains to make and use the same.

My invention relates to improvements in drill feeds, more especially designed for reciprocating rock drills, although it is not restricted to such use.

The object of my invention is to produce a simple pneumatic drill feed, whereby the same line of hose which supplies compressed air to operate the drill also automatically feeds the drill forward.

A further object of my invention is to provide means for preventing this forward feed when desired.

With these objects in view, my invention consists in the construction and combinations of parts as hereinafter described and claimed.

In the accompanying drawings:—Figure 1 is a side elevation of my improved drill feed showing the same in position to operate a reciprocating rock drill, and Fig. 2 is a cross section on an enlarged scale of the same.

$a$ represents the base piece, preferably provided with a spur $b$ which rests on a plank or other suitable support. Into the base piece $a$ is screwed a tube $c$ open at both ends. The upper part of this tube is surrounded by an enlarged gland $d$ in which is fitted a stuffing box $e$ provided with packing $f$, a nut $g$ being used to close the same. The upper part of the stuffing box is provided with a screw thread $h$. Within the tube $c$ is located a smaller tube $i$ adapted to slide freely through the stuffing box $e$ and guided by said stuffing box and a projection $j$ on the lower part of the tube which guides the tube $i$ in the tube $c$. The lower end of the tube $i$ is open and near its lower end it is provided with a series of perforations $k$ to permit the air to pass freely from the outer tube into the inner tube in all relative positions of the tubes.

$l$ represents a hose provided with a valve $m$ which supplies compressed air or other motor fluid to the tube $c$. Into the upper end of the tube $i$ is screwed a solid plug provided with a small passage, and on this plug is mounted the casing $o$ which carries the drill operating mechanism.

$p$ represents the drill which is mounted in the casing $o$. A short pipe $q$ communicates with the passage $n$ and supplies air from said passage into the casing $o$, thus operating the drill $p$.

$r$ represents a valve of ordinary construction for opening or closing the passage $n$.

The tube $i$ near its upper end is provided with a collar $s$, and above the collar is located a revoluble annular collar $t$ provided with a screw thread at its lower end which is adapted to engage with the screw thread $h$ and prevent the tube $i$ from being pushed forward by the action of the compressed air during the operation of the drill, this arrangement being useful, for example, when the drill is used to drill a hole downward, the weight of the apparatus in such a case usually serving to feed the drill sufficiently. In case, however, it is desired to drill a hole upward as in Fig. 1, the collar $t$ is disengaged from the screw thread $h$.

The operation is as follows: The valves $m$ and $r$ being opened, compressed air rushes in through the hose $l$ into the tube $c$ and thence into the tube $i$. The air then passes into the casing $o$ where it operates the drill in the usual manner, and at the same time tends to lift the tube $i$ which is loosely mounted in the tube $c$. The air from a single line of hose, therefore, not only operates the drill, but feeds it forward.

Another advantage of the construction shown, is that the drill $p$ can be completely rotated in the same direction a number of times without interfering with or stopping its action. This rotation may be accomplished simply by turning the tube $i$. In many of the small pneumatic drills now in use, this is not possible.

Having thus described my invention, what I claim as new and desire to secure by Letters Patent of the United States is:—

The combination of an outer tube closed at one end and provided with a stuffing box at the other end, said stuffing box having a projecting screw threaded end, an air hose connected to said tube, an inner tube telescoping freely in said outer tube and passing through said stuffing box, said inner tube being provided with a collar, and an annular collar surrounding said inner tube and provided with an internal screw thread adapted to engage the screw on the projecting end of said stuffing box, substantially as described.

In testimony whereof, I affix my signature, in presence of two witnesses.

ELMER F. SMITH.

Witnesses:
CURTIS J. SMITH,
WM. H. BALE.